US011869437B2

(12) United States Patent
Lee et al.

(10) Patent No.: US 11,869,437 B2
(45) Date of Patent: Jan. 9, 2024

(54) DISPLAY DEVICE AND DRIVING METHOD THEREOF

(71) Applicant: Samsung Display Co., Ltd., Yongin-si (KR)

(72) Inventors: Sang Ik Lee, Yongin-si (KR); Joon Chul Goh, Yongin-si (KR); Min Seok Bae, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 59 days.

(21) Appl. No.: 17/855,704

(22) Filed: Jun. 30, 2022

(65) Prior Publication Data
US 2023/0112481 A1 Apr. 13, 2023

(30) Foreign Application Priority Data
Oct. 7, 2021 (KR) .......................... 10-2021-0133442

(51) Int. Cl.
*G09G 3/3258* (2016.01)
*G09G 3/3275* (2016.01)
*G06V 10/82* (2022.01)

(52) U.S. Cl.
CPC .......... *G09G 3/3258* (2013.01); *G06V 10/82* (2022.01); *G09G 3/3275* (2013.01); *G09G 2300/0426* (2013.01); *G09G 2300/0819* (2013.01); *G09G 2300/0842* (2013.01); *G09G 2310/08* (2013.01); *G09G 2320/0233* (2013.01); *G09G 2320/0257* (2013.01)

(58) Field of Classification Search
CPC .......... G06N 3/02; G06N 3/0454; G06N 3/08; G06K 7/1482; G06V 10/82; G06V 10/70; G06V 10/88
See application file for complete search history.

(56) References Cited

U.S. PATENT DOCUMENTS

| 9,330,605 | B2 | 5/2016 | Park | |
| 2019/0266955 | A1* | 8/2019 | Kurokawa | ............. B60K 37/02 |
| 2019/0371226 | A1 | 12/2019 | Iwaki | |
| 2020/0327845 | A1* | 10/2020 | Nathan | ................ G09G 3/3283 |
| 2021/0028265 | A1* | 1/2021 | Kim | ..................... G09G 3/3208 |

(Continued)

FOREIGN PATENT DOCUMENTS

| KR | 10-2018-0021947 | 3/2018 |
| KR | 10-2075920 | 2/2020 |

(Continued)

*Primary Examiner* — Nitin Patel
*Assistant Examiner* — Amen W Bogale
(74) *Attorney, Agent, or Firm* — H.C. Park & Associates, PLC

(57) ABSTRACT

A display device including pixels connected to a data line and a sensing line; a data driver supplying one of an image data signal and a sensing data signal to the data line; a sensing unit supplying an initialization voltage to at least one of the pixels through the sensing line and obtaining a sensing current value from at least one of the pixels through the sensing line; and a compensator generating compensation image data according to a sensing pixel current value among the sensing current value using an artificial neural network model learned to output reference image data corresponding to at least one reference sensing current value among the sensing current value.

10 Claims, 12 Drawing Sheets

(56) References Cited

U.S. PATENT DOCUMENTS

2021/0210517 A1* 7/2021 Kawashima ........ H01L 27/1255
2022/0013072 A1    1/2022 Kim et al.

FOREIGN PATENT DOCUMENTS

| KR | 10-2156776 | 9/2020 |
| KR | 10-2021-0019627 | 2/2021 |
| KR | 10-2274855 | 7/2021 |
| KR | 10-2022-0007808 | 1/2022 |

\* cited by examiner

FIG. 9

| | 16 Gray | 64 Gray |
|---|---|---|
| Compensation OFF (Comparative Example) | σ = 1.6nit | σ = 4.2nit |
| Compensation ON (Comparative Example) | σ = 1.0nit | σ = 2.0nit |
| Compensation ON (Embodiment) | σ = 0.1nit | σ = 0.3nit |

FIG. 10

|  | 16 Gray | | 64 Gray | |
| --- | --- | --- | --- | --- |
|  | Ids [nA] | Luminance σ [nit] | Ids [nA] | Luminance σ [nit] |
| Compensation OFF (Comparative Example) | 1.6 | 0.8 | 4.2 | 2.6 |
| Compensation ON (Comparative Example) | 1.0 | 0.1 | 2.0 | 1.4 |
| Compensation ON (Embodiment) | 0.1 | 0.3 | 0.3 | 0.9 |

DISPLAY DEVICE AND DRIVING METHOD THEREOF

CROSS-REFERENCE TO RELATED APPLICATION

The application claims priority from and the benefit of Korean Patent Application No. 10-2021-0133442, filed Oct. 7, 2021, which is hereby incorporated by reference for all purposes as if fully set forth herein.

BACKGROUND

Field

Embodiments of the invention relate to a display device and a driving method thereof and, more specifically, to a display device to which an external compensation method is applied and a driving method thereof.

Discussion of the Background

As interest in information display increases and demand to use portable information media increases, demand for display devices and commercialization thereof keep increasing.

A display device displays an image using pixels connected to a plurality of scan lines and data lines. To this end, each of the pixels includes a light emitting element and a driving transistor.

The driving transistor controls the amount of current supplied to the light emitting element in response to a data signal supplied from a data line, and the light emitting element generates light of a predetermined luminance in response to the amount of current supplied from the driving transistor.

In order for the display device to display an image of uniform image quality, the driving transistor included in each of the pixels must supply a uniform current to the light emitting element in response to the data signal (or an image data signal). However, the driving transistor included in each of the pixels has a difference in characteristics, such as a threshold voltage and/or mobility for each pixel for reasons such as a process deviation or the like, and a luminance deviation and an afterimage may occur in each of the pixels according to deterioration of the light emitting element and the like.

Accordingly, it is necessary to compensate for the data signal supplied to the pixels by sensing a difference in characteristics of the driving transistor included in each of the pixels.

The above information disclosed in this Background section is only for understanding of the background of the inventive concepts, and, therefore, it may contain information that does not constitute prior art.

SUMMARY

An embodiment of the present invention provides a display device having improved luminance deviation, afterimage, and the like, and a driving method thereof.

Additional features of the inventive concepts will be set forth in the description which follows, and in part will be apparent from the description, or may be learned by practice of the inventive concepts.

An embodiment of the present invention provides a display device including pixels connected to a data line and a sensing line; a data driver supplying one of an image data signal and a sensing data signal to the data line; a sensing unit supplying an initialization voltage to at least one of the pixels through the sensing line and obtaining a sensing current value from at least one of the pixels through the sensing line; and a compensator generating compensation image data according to a sensing pixel current value among the sensing current value using an artificial neural network model learned to output reference image data corresponding to at least one reference sensing current value among the sensing current value.

The sensing unit may supply a preset reference initialization voltage among the initialization voltage to the pixels, and obtain the at least one reference sensing current value, and the at least one reference sensing current value may include a first reference sensing current value and a second reference sensing current value.

The sensing unit may supply a preset first reference initialization voltage and a preset second reference initialization voltage among the initialization voltage to the pixels, and obtain the first reference sensing current value corresponding to the first reference initialization voltage and the second reference sensing current value corresponding to the second reference initialization voltage from each of the pixels.

The artificial neural network model may include an input layer, a hidden layer, and an output layer to which artificial neurons are combined.

The input layer may receive the first reference sensing current value and the second reference sensing current value for each pixel among the pixels, and the output layer may output the reference image data corresponding to the first reference sensing current value and the second reference sensing current value.

The artificial neural network model may perform deep learning through the artificial neurons so that the reference image data corresponding to the first reference sensing current value and the second reference sensing current value are output from each of the pixels.

The input layer may receive the sensing pixel current value, and the compensator may generate the compensation image data corresponding to the sensing pixel current value by using a learned artificial neural network model.

The compensator may provide the compensation image data to the data driver, and the data driver may supply the image data signal to the pixels based on the compensation image data.

The pixels may be connected to a scan line and a control line. Each of the pixels may include: a light emitting element; a first transistor including a gate electrode connected to a first node, a first electrode connected to a first driving voltage through a first power source line, and a second electrode connected to a first electrode of the light emitting element; a second transistor including a gate electrode connected to the scan line, a first electrode connected to the data line, and a second electrode connected to the first node; a third transistor including a gate electrode connected to the control line, a first electrode connected to the sensing line, and a second electrode connected to the second electrode of the first transistor; and a storage capacitor connected between the first node and the second electrode of the first transistor.

Another embodiment of the present invention provides a driving method of a display device including pixels connected to a scan line, a control line, a data line, and a sensing line, the display device being driven to include a display period for displaying an image and a sensing period for sensing characteristics of a driving transistor included in each of the pixels, the driving method including: supplying a sensing data signal to the data line and an initialization voltage to the sensing line during the sensing period; obtaining a sensing current value from at least one of the pixels through the sensing line; and generating compensation image data according to a sensing pixel current value among the sensing current value using an artificial neural network model learned to output reference image data corresponding to at least one reference sensing current value among the sensing current value.

In the supplying the initialization voltage, a preset reference initialization voltage among the initialization voltage may be supplied to the pixels, and in the obtaining the sensing current value, the at least one reference sensing current value may be obtained.

The driving method may include: supplying a preset first reference initialization voltage among the initialization voltage to the pixels, and obtaining a first reference sensing current value corresponding to the first reference initialization voltage; and supplying a preset second reference initialization voltage among the initialization voltage to the pixels, and obtaining a second reference sensing current value corresponding to the second reference initialization voltage.

The driving method may further include storing the first reference sensing current value and the second reference sensing current value.

The driving method may further include performing deep learning using the artificial neural network model so that the reference image data corresponding to the first reference sensing current value and the second reference sensing current value is output from each of the pixels.

The artificial neural network model may include an input layer, a hidden layer, and an output layer to which artificial neurons are combined. The input layer may receive the sensing current value, and the output layer may output the compensation image data.

The input layer may receive the first reference sensing current value and the second reference sensing current value for each pixel among the pixels; and the output layer may output the reference image data corresponding to the first reference sensing current value and the second reference sensing current value.

The input layer may receive the sensing pixel current value and generate the compensation image data corresponding to the sensing pixel current value using a learned artificial neural network model.

The driving method may further include supplying an image data signal generated based on the compensation image data to the pixels through the data line.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

FIG. 9 is an image illustrating an effect of improving a display unit according to compensation of image data in a display device according to a comparative example and the display device according to an embodiment.

FIG. 10 is a table illustrating the effect of improving the display unit according to compensation of image data in the display device according to the comparative example and the display device according to an embodiment.

DETAILED DESCRIPTION

Figure 1:
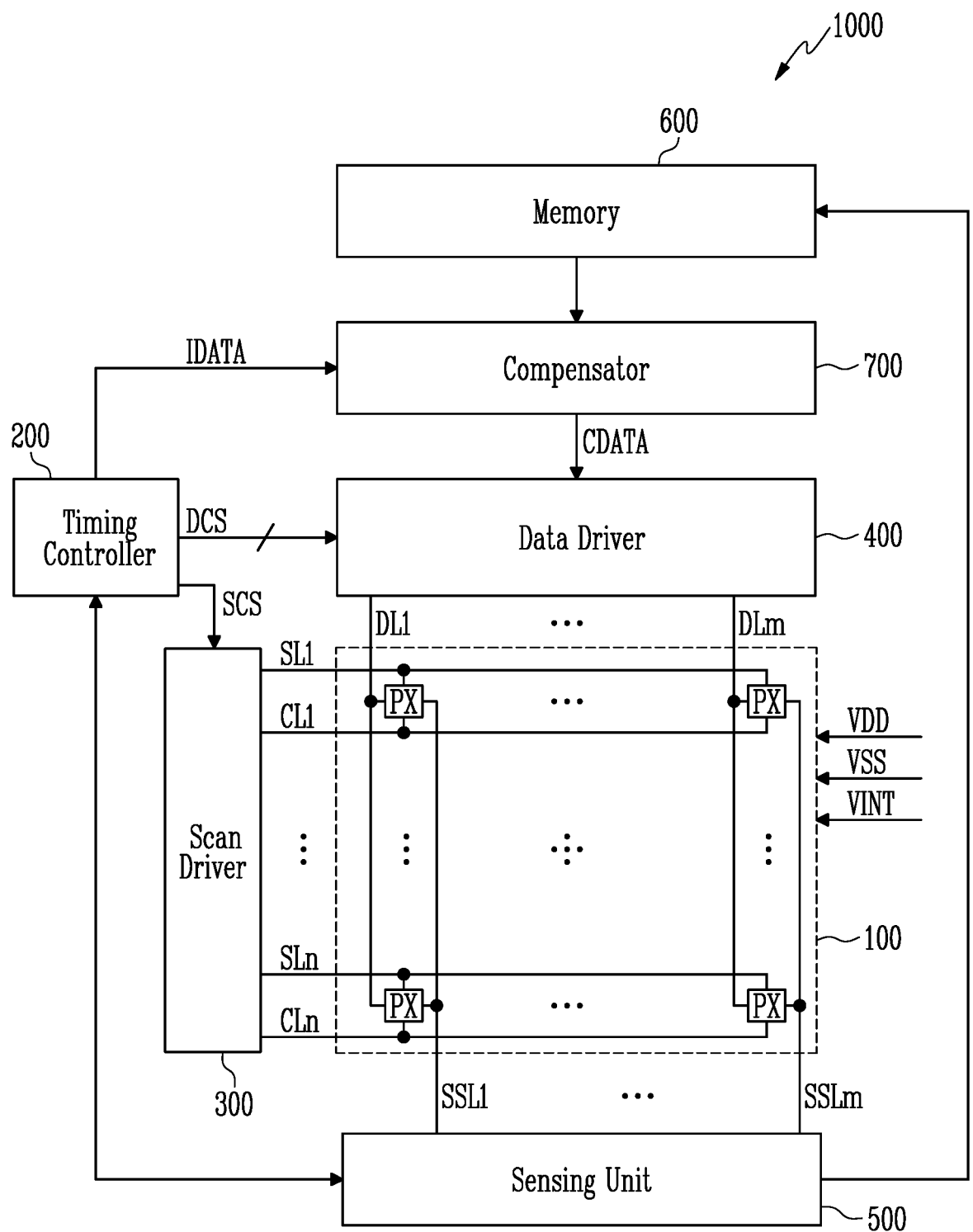
FIG. 1 is a block diagram illustrating a display device according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram illustrating a display device according to an embodiment.

Referring to FIG. 1, a display device 1000 may include a pixel unit 100, a timing controller 200, a scan driver 300, a data driver 400, a sensing unit 500, and a compensator 700.

The display device 1000 may be a flat panel display device, a flexible display device, a curved display device, a foldable display device, or a bendable display device. Also, the display device 1000 may be applied to a transparent display device, a head-mounted display device, a wearable display device, and the like. Also, the display device 1000 may be applied to various electronic devices, such as a smart phone, a tablet, a smart pad, a TV, and a monitor.

The display device 1000 may be implemented as an organic light emitting display device, an inorganic light emitting display device, a display device having micro-scale to nano-scale inorganic light emitting elements, and the like. However, these are only examples, and the configuration of the display device 1000 is not limited thereto.

In an embodiment, the display device 1000 may be driven to include a display period for displaying an image and a sensing period for sensing characteristics (for example, a threshold voltage and/or mobility) of a driving transistor included in each of pixels PX. A driving method of the display device 1000 will be described in detail below with reference to FIGS. 2 and 3.

The pixel unit 100 may include pixels PX connected to data lines DL1 to DLm, scan lines SL1 to SLn, control lines CL1 to CLn, and sensing lines SSL1 to SSLm, where m and m are natural numbers. The pixels PX may receive a first driving voltage VDD, a second driving voltage VSS, and an initialization voltage VINT from outside (for example, a voltage supply unit).

Although n scan lines SL1 to SLn are shown in FIG. 1, the inventive concepts are not limited thereto. For example, one or more control lines, scan lines, emission control lines, sensing lines, and the like may be additionally formed in the pixel unit 100 to correspond to the circuit structure of the pixel PX.

The timing controller 200 may generate a data driving control signal DCS and a scan driving control signal SCS in response to synchronization signals supplied from outside. The scan driving control signal SCS generated by the timing controller 200 may be supplied to the scan driver 300, and the data driving control signal DCS may be supplied to the data driver 400.

The scan driving control signal SCS may include a scan start signal, a control start signal, and clock signals. The scan start signal may control the timing of the scan signal, and the control start signal may control the timing of a control signal. The clock signals may be used to shift the scan start signal and/or the control start signal.

The data driving control signal DCS may include a source start signal and clock signals. The source start signal may control the timing at which data sampling starts. The clock signals may be used to control a sampling operation.

The timing controller 200 may control an operation of the sensing unit 500. For example, the timing controller 200 may control the timing of supplying the initialization voltage VINT to the pixels PX through the sensing lines SSL1 to SSLm and/or the timing of sensing the current generated in the pixel PX through the sensing lines SSL1 to SSLm.

In addition, in an embodiment, the timing controller 200 may receive a sensing voltage control signal from the sensing unit 500 and provide a signal for changing a sensing data signal and/or the initialization voltage VINT based on the sensing voltage control signal to the data driver 400 and/or the compensator 700, to be described later.

The scan driver 300 may receive the scan driving control signal SCS from the timing controller 200. The scan driver 300 receiving the scan driving control signal SCS may supply a scan signal to the scan lines SL1 to SLn and supply a control signal to the control lines CL1 to CLn.

For example, the scan driver 300 may sequentially supply the scan signal to the scan lines SL1 to SLn. When the scan signal is sequentially supplied to the scan lines SL1 to SLn, pixels PX may be selected in units of horizontal lines. To this end, the scan signal may be set to a gate-on voltage (for example, a logic high level) so that transistors included in the pixels PX may be turned on.

Similarly, the scan driver 300 may supply the control signal to the control lines CL1 to CLn. The control signal may be used to sense (or extract) a driving current flowing through the pixel PX (that is, a current flowing through the driving transistor). The timing and waveform to which the scan signal and the control signal are supplied may be set differently according to the display period and the sensing period.

Although FIG. 1 shows an embodiment in which one scan driver 300 outputs both the scan signal and the control signal as an example, the present invention is not limited thereto. For example, the scan driver 300 may include a first scan driver that supplies the scan signal to the pixel unit 100 and a second scan driver that supplies the control signal to the pixel unit 100.

The data driver 400 may receive the data driving control signal DCS from the timing controller 200. The data driver 400 may supply a data signal (for example, a sensing data signal) for detecting characteristics of the pixel to the pixel unit 100 during the sensing period. The data driver 400 may supply a data signal (for example, an image data signal) for displaying an image to the pixel unit 100 based on compensation image data CDATA during the display period.

During the display period, the sensing unit 500 may supply a predetermined voltage for displaying an image to the pixel unit 100 through the sensing lines SSL1 to SSLm.

During the sensing period, the sensing unit 500 may supply a predetermined reference voltage (for example, the initialization voltage VINT) to the pixels PX through the sensing lines SSL1 to SSLm, and receive a current or voltage extracted from the pixel PX. The current or voltage extracted from the pixel PX may correspond to a sensing value, and the sensing value may include characteristic information of the driving transistor or information of a light emitting element. The sensing unit 500 will be described in detail below with reference to FIG. 5.

The sensing unit 500 may store the sensing value (for example, a sensing current value) extracted through a sensing line SSLk in a memory 600. Here, the sensing current value may include a reference sensing current value and a sensing pixel current value. The reference sensing current value may be a sensing value extracted corresponding to each of the pixels PX, and the sensing pixel current value may be a sensing value extracted corresponding to the sensing pixel PX.

In an embodiment, the memory 600 may store two reference sensing current values (for example, a first reference sensing current value and a second reference sensing current value) for each pixel PX. Also, the memory 600 may store a sensing current value of the sensing pixel PX.

The compensator 700 may generate the compensation image data CDATA for compensating for characteristic values of the pixels PX based on the sensing value (for example, the sensing pixel current value) provided from the memory 600. For example, the compensator 700 may generate the compensation image data CDATA by compensating input image data IDATA by reflecting changes in threshold voltage and mobility of the driving transistor included in the pixel PX, and a change in characteristics of the light emitting element.

In an embodiment, the compensator 700 may generate the compensation image data CDATA according to the sensing pixel current value among the sensing current value by using an artificial neural network model learned to output reference image data corresponding to at least one reference sensing current value among the sensing current value. Here, at least one reference sensing current value among the sensing current value may be provided from the memory 600. The compensator 700 will be described in detail below with reference to FIG. 5.

The compensator 700 may provide the generated compensation image data CDATA to the data driver 400. The input image data DATA and the compensation image data CDATA may include grayscale information included in a grayscale range set in the display device 1000. The data driver 400 may supply the image data signal generated based on the compensation image data CDATA to the pixel unit 100.

According to the embodiment, since the compensation image data reflecting the characteristics of the driving transistor may be generated using the learned artificial neural network model, a display device having improved luminance deviation and afterimage can be implemented.

In FIG. 1, the sensing unit 500 is shown as being separate from the timing controller 200, but at least a portion of the sensing unit 500 may be included in the timing controller 200. For example, the sensing unit 500 and the timing controller 200 may be formed as a single driving IC. Furthermore, the data driver 400 may also be included in the timing controller 200. Accordingly, at least some of the sensing unit 500, the data driver 400, and the timing controller 200 may be formed of one driving IC.

Hereinafter, a pixel included in the display device according to an embodiment will be described with reference to FIG. 2.

Figure 2:
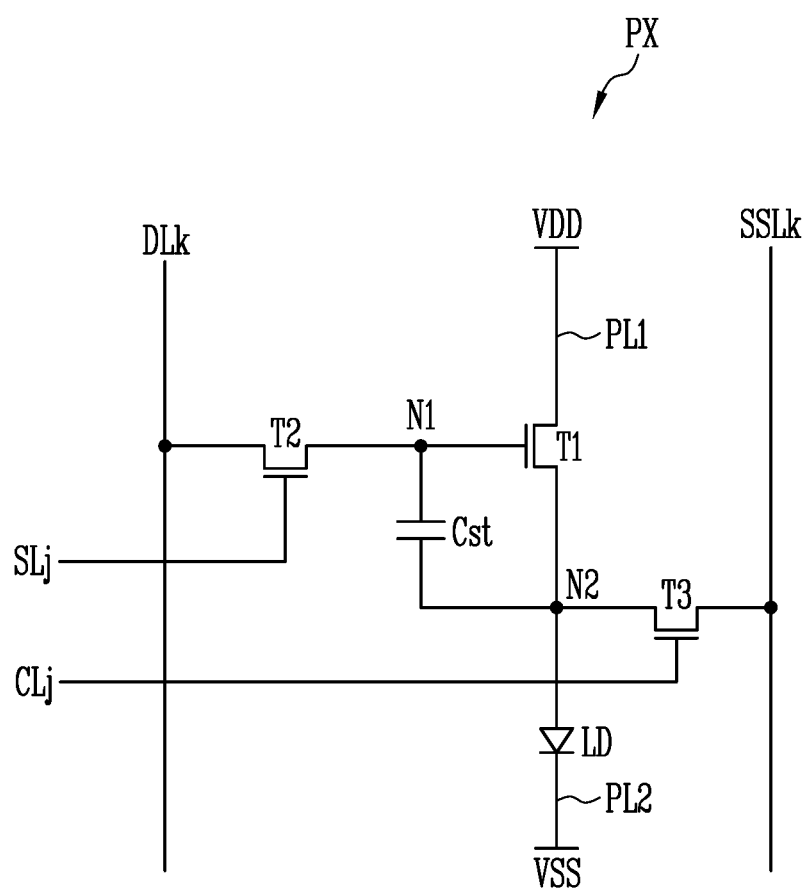
FIG. 2 is a equivalent circuit diagram illustrating an example of a pixel included in the display device of FIG. 1.

FIG. 2 is an equivalent circuit diagram illustrating an example of a pixel included in the display device of FIG. 1. In FIG. 2, a pixel PX positioned in a j-th row (or horizontal line) and a k-th column is shown for convenience of explanation.

Referring to FIG. 2, the pixel PX may include a light emitting element LD, a first transistor T1, a second transistor T2, a third transistor T3, and a storage capacitor Cst.

A first electrode of the light emitting element LD may be connected to a second node N2, and a second electrode may be connected to the second driving voltage VSS through a second power source line PL2. In an embodiment, the first electrode may be an anode, and the second electrode may be a cathode. According to an embodiment, the first electrode may be a cathode and the second electrode may be an anode. The light emitting element LD may generate light having a predetermined luminance in response to the amount of current supplied from the first transistor T1.

A first electrode of the first transistor T1 (or a driving transistor) may be connected to the first driving voltage VDD through a first power source line PL1, and a second electrode may be connected to the first electrode of the light emitting element LD. A gate electrode of the first transistor T1 may be connected to a first node N1. The first transistor T1 may control the amount of current flowing into the light emitting element LD in response to a voltage of the first node N1.

A first electrode of the second transistor T2 (or a switching transistor) may be connected to a data line DLk, and a second electrode may be connected to the first node N1. A gate electrode of the second transistor T2 may be connected to a scan line SLj. The second transistor T2 may be turned on when the scan signal is supplied to the scan line SLj to transmit the data signal from the data line DLk to the first node N1.

The third transistor T3 (or a sensing transistor) may be connected between a sensing line SSLk and the second electrode of the first transistor T1 (that is, the second node N2). That is, a first electrode of the third transistor T3 may be connected to the sensing line SSLk, a second electrode may be connected to the second electrode of the first transistor T1, and a gate electrode of the third transistor T3 may be connected to a control line CLj. The third transistor T3 may be turned on when the control signal is supplied to the control line CLj to electrically connect the sensing line SSLk and the second node N2 (that is, the second electrode of the first transistor T1).

In an embodiment, when the third transistor T3 is turned on, the initialization voltage VINT may be supplied to the second node N2. Also, when the third transistor T3 is turned on, a current generated by the first transistor T1 may be supplied to the sensing unit 500 (refer to FIG. 1).

The storage capacitor Cst may be connected between the first node N1 and the second node N2. The storage capacitor Cst may store a voltage corresponding to a voltage difference between the first node N1 and the second node N2.

In the inventive concepts, a circuit structure of the pixel PX is not limited to that shown in FIG. 2. For example, the light emitting element LD may be positioned between the first power source line PL1 and the first electrode of the first transistor T1. In addition, a parasitic capacitor may be formed between the gate electrode (that is, the first node N1) and the drain electrode of the first transistor T1.

Although the transistors T1, T2, and T3 are shown as NMOS transistors in FIG. 2, the inventive concepts are not limited thereto. For example, at least one of the transistors T1, T2, and T3 may be formed of a PMOS transistor. Also, the transistors T1, T2, and T3 shown in FIG. 2 may be thin film transistors including at least one of an oxide semiconductor, an amorphous silicon semiconductor, and a polycrystalline silicon semiconductor.

Hereinafter, a driving method of the display device and the pixel shown in FIGS. 1 and 2 will be described with reference to FIG. 3.

Figure 3:
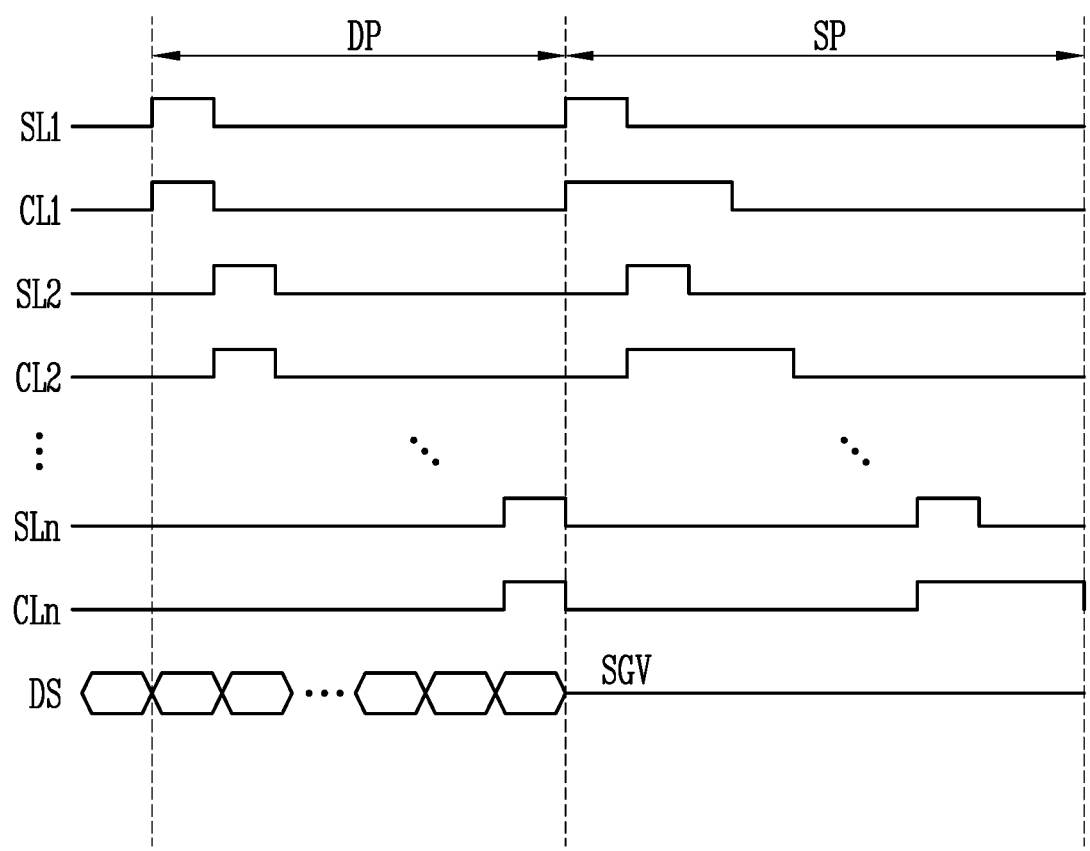
FIG. 3 and FIG. 4 are timing diagrams illustrating an example of operations of the display device and the pixel of FIGS. 1 and 2.
Figure 4:
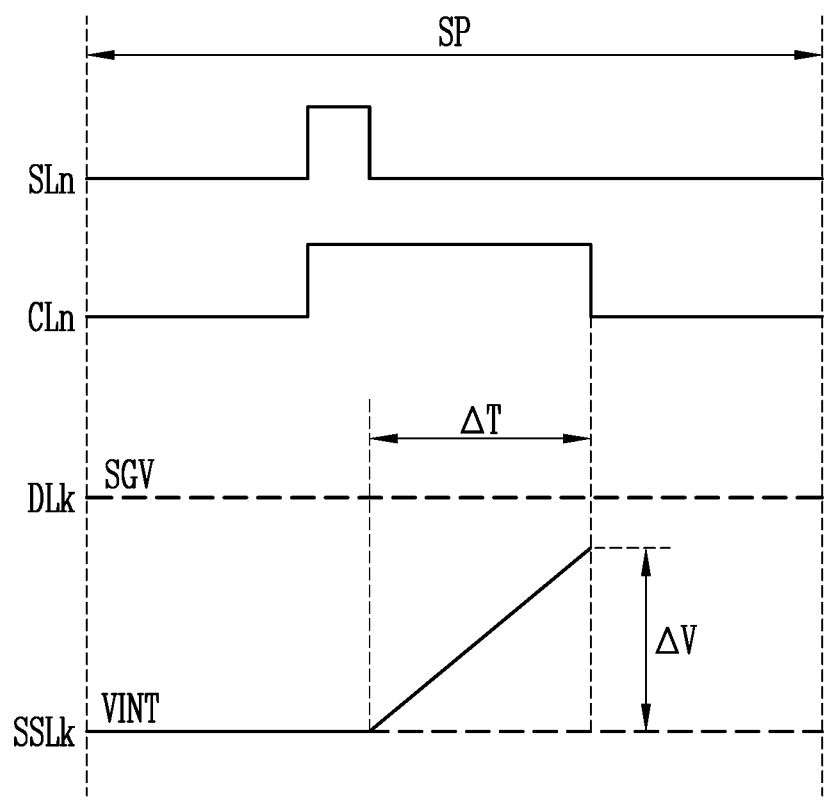

FIGS. 3 and 4 are timing diagrams illustrating an example of operations of the display device and the pixel of FIGS. 1 and 2. Hereinafter, this example will be described with reference to FIGS. 1 and 2 together.

Referring to FIG. 3, the display device 1000 may be driven to include a display period DP for displaying an image and a sensing period SP for sensing characteristics of the driving transistor (or the first transistor T1) included in each of the pixels PX.

During the display period DP, the scan driver 300 may sequentially supply the scan signal to the scan lines SL1 to SLn. During the display period DP, the scan driver 300 may sequentially supply the control signal to the control lines CL1 to CLn. Also, during the display period DP, the initialization voltage VINT that is a constant voltage may be supplied to the sensing lines SSL1 to SSLm.

For the j-th horizontal line, the scan signal and the control signal may be supplied substantially simultaneously. Accordingly, the second transistor T2 and the third transistor T3 may be simultaneously turned on or turned off.

When the second transistor T2 is turned on, an image data signal DS corresponding to the compensation image data CDATA may be supplied to the first node N1.

When the third transistor T3 is turned on, the initialization voltage VINT may be supplied to the second node N2. Accordingly, the storage capacitor Cst may store a voltage corresponding to a voltage difference between the image data signal DS and the initialization voltage VINT. Here, since the initialization voltage VINT is set to a constant voltage, the voltage stored in the storage capacitor Cst may be stably determined by the image data signal DS.

When the supply of the scan signal and the control signal to a j-th scan line SLj and a j-th control line CLj is stopped, the second transistor T2 and the third transistor T3 may be turned off.

Thereafter, the first transistor T1 may control the amount of current (driving current) supplied to the light emitting element LD in response to the voltage stored in the storage capacitor Cst. Accordingly, the light emitting element LD may emit light with a luminance corresponding to the driving current of the first transistor T1.

During the sensing period SP, the scan driver 300 may sequentially supply the scan signal to the scan lines SL1 to SLn. Also, during the sensing period SP, the scan driver 300 may sequentially supply the control signal to the control lines CL1 to CLn.

The length of the control signal supplied in the sensing period SP may be greater than the length of the control signal supplied in the display period DP. Also, in the sensing period SP, a portion of the control signal supplied to the j-th control line CLj may overlap the scan signal supplied to the j-th scan line SLj. The length of the control signal may be greater than the length of the scan signal. For example, the control signal supplied to the j-th control line CLj may start to be supplied simultaneously with the scan signal supplied to the j-th scan line SLj, and the control signal may be supplied for a longer time than the scan signal.

Referring to FIG. 4, in a section in which the scan signal and the control signal are simultaneously supplied, the second and third transistors T2 and T3 may be turned on. When the second transistor T2 is turned on, a sensing data signal SGV (or a sensing data voltage) for sensing may be supplied to the first node N1. At the same time, as the third transistor T3 is turned on, the initialization voltage VINT may be supplied to the second node N2. Accordingly, the voltage corresponding to a voltage difference between the sensing data signal SGV and the initialization voltage VINT may be stored in the storage capacitor Cst.

Thereafter, when the supply of the scan signal is stopped, the second transistor T2 may be turned off, and the first transistor T1 may supply a sensing current corresponding to the voltage difference between the sensing data signal SGV (or the voltage of the first node N1) and the initialization voltage VINT (or a voltage of the second node N2) to the second node N2.

At this time, since the control signal is supplied to the n-th control line CLn for a longer time than the scan signal supplied to the n-th scan line SLn, the third transistor T3 may be in a turned-on state, and the sensing current supplied to the second node N2 through the sensing line SSLk may flow. A voltage of the sensing line SSLk may gradually increase, and the amount of change A V in the voltage of the sensing line SSLk may correspond to a value obtained by dividing a sensing capacitor CSSLk formed on the sensing line SSLk by a product of a sensing current Ids reflecting the electron mobility component of the first transistor T1 and the amount of change over time A T. Thereafter, the third transistor T3 may be turned off, and the amount of change in the voltage of the sensing line SSLk may be sampled through an analog-to-digital converter, so that the electron mobility may be sensed. That is, the sensing current may be provided to the sensing unit 500 through the sensing line SSLk, and the sensing unit 500 may convert the analog sensing current into the digital sensing current value (or the sensing current value) using an analog-to-digital converter and obtain it.

Hereinafter, the display device that performs compensation using a sensing current value will be described with reference to FIGS. 5 to 8. FIGS. 5 to 8 will be described with reference to FIGS. 1 to 4 described above.

Figure 5:
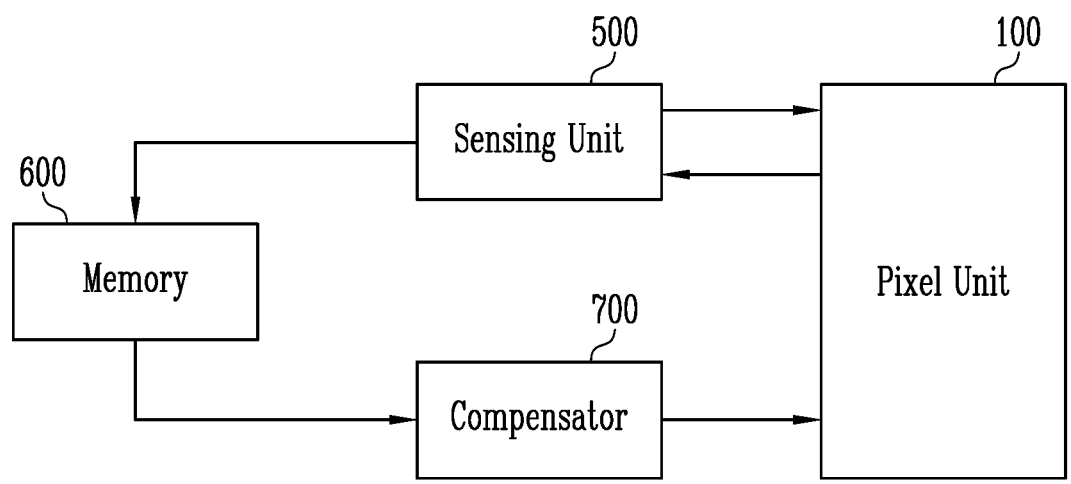
FIG. 5 is a block diagram for explaining a process of compensating for image data in the display device according to an embodiment.
Figure 6:
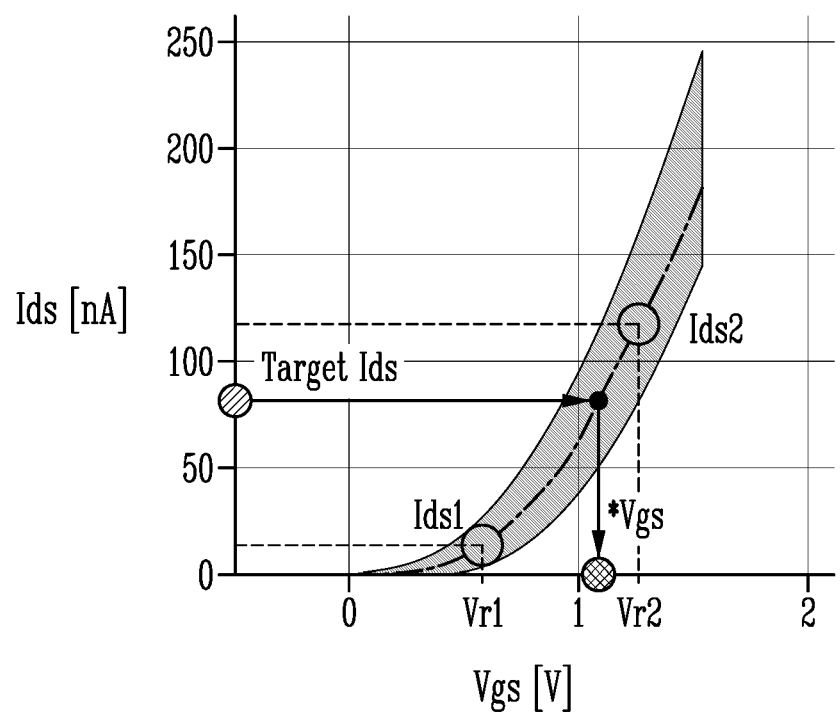
FIG. 6 is a graph illustrating a sensing current of a driving transistor with respect to a gate-source voltage of the driving transistor in the display device according to an embodiment.
Figure 7:
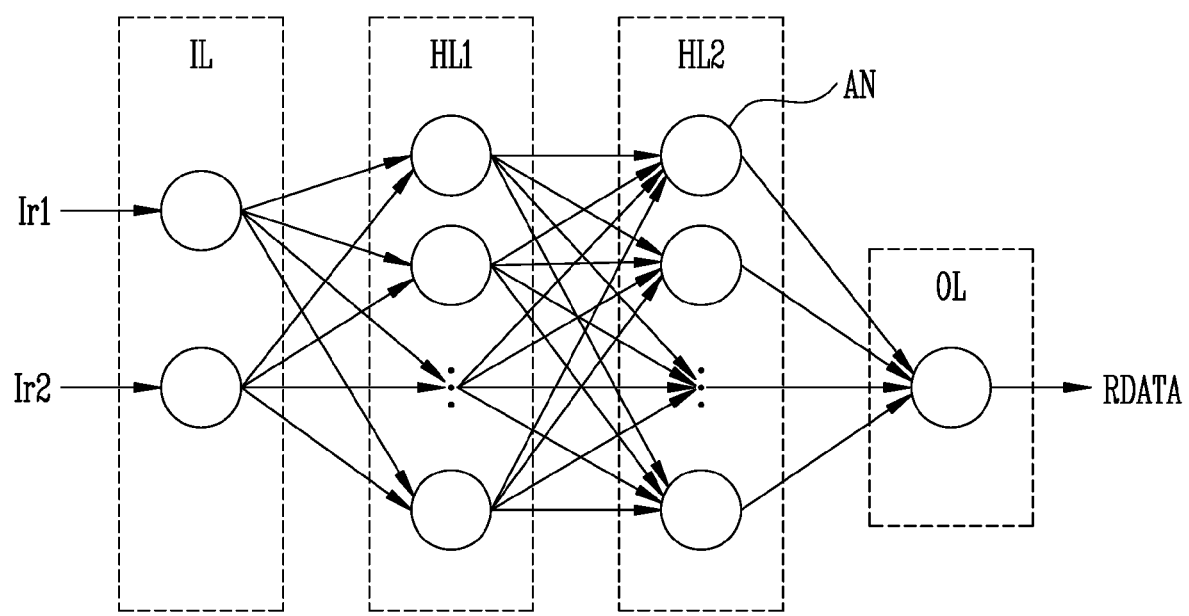
FIG. 7 and FIG. 8 are diagrams illustrating an artificial neural network model implemented in the display device according to an embodiment.
Figure 8:
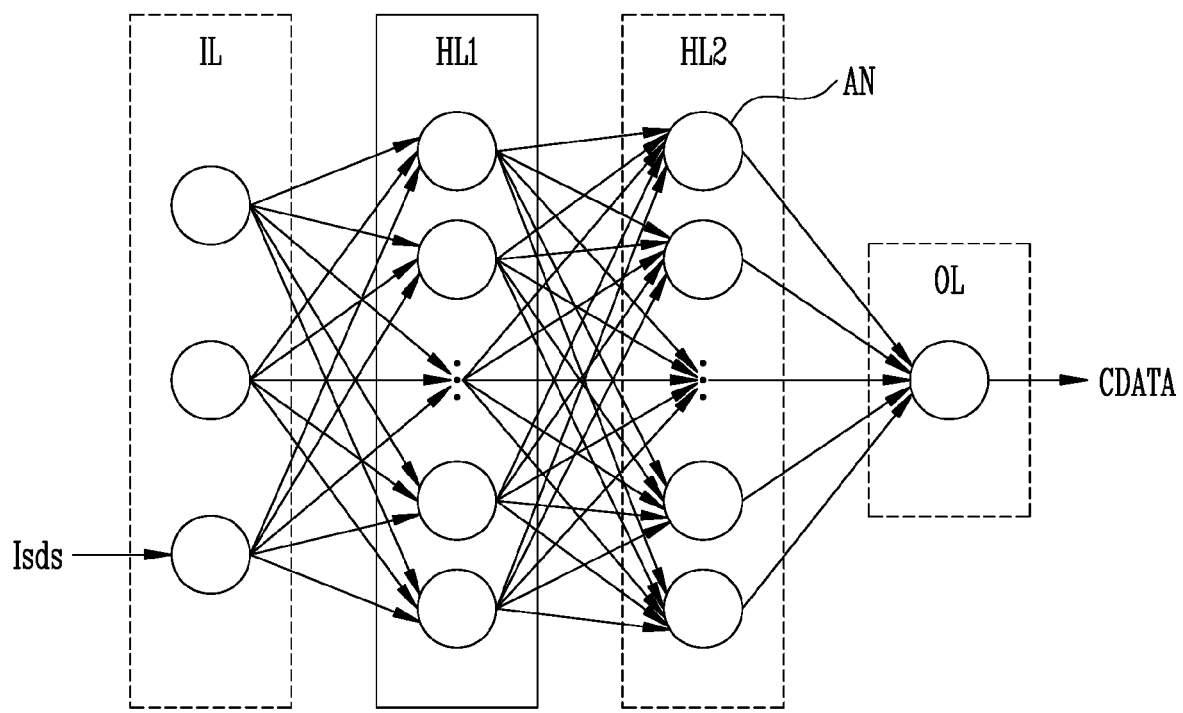

FIG. 5 is a block diagram for explaining a process of compensating for image data in the display device according to an embodiment. FIG. 6 is a graph illustrating a sensing current of a driving transistor with respect to a gate-source voltage of the driving transistor in the display device according to an embodiment. FIGS. 7 and 8 are diagrams illustrating an artificial neural network model implemented in the display device according to an embodiment.

Referring to FIG. 5, the display device according to an embodiment may include the pixel unit 100, the sensing unit 500, the memory 600, and the compensator 700.

The sensing unit 500 may supply the initialization voltage VINT to at least one pixel PX of the pixels PX through the sensing line SSLk. Also, the sensing unit 500 may obtain the sensing current value from at least one pixel PX of the pixels PX through the sensing line SSLk.

In an embodiment, the sensing unit 500 may supply a preset reference initialization voltage among the initialization voltage VINT to the pixel PX and obtain at least one reference sensing current value. Here, the at least one reference sensing current value may include the first reference sensing current value and the second reference sensing current value. The relationship between the reference initialization voltage and the reference sensing current can be viewed with reference to FIG. 6.

Referring to FIG. 6, a change in the sensing current Ids according to a gate-source voltage Vgs of the driving transistor T1 may be confirmed.

The sensing current Ids may increase as the gate-source voltage Vgs of the driving transistor T1 increases. Also, the sensing current Ids corresponding to the gate-source voltage Vgs of the driving transistor T1 in each pixel PX may be predicted. For example, a sensing current Target Ids corresponding to a gate-source voltage *Vgs of the driving transistor T1 in a predetermined sensing pixel PX may be predicted. Here, a gate voltage of the driving transistor T1 may be the voltage of the first node N1 connected to the gate electrode of the first transistor T1 described with reference to FIG. 2, and a source voltage of the driving transistor T1 may be the voltage of the second node N2 connected to the second electrode of the first transistor T1 described with reference to FIG. 2. In addition, the sensing data signal SGV may be applied to the first node N1 in the sensing period SP, and the initialization voltage VINT may be applied to the second node N2 in the sensing period SP. Accordingly, the gate-source voltage Vgs of the driving transistor T1 may correspond to the voltage difference between the sensing data signal SGV and the initialization voltage VINT in the sensing period SP.

In an embodiment, the sensing unit 500 may supply a preset first reference initialization voltage Vr1 among the initialization voltage VINT to the pixels PX, and extract a first reference sensing current Ids1 corresponding to the first reference initialization voltage Vr1. Also, the sensing unit 500 may supply a second reference initialization voltage Vr2 to the pixels PX and extract a second reference sensing current Ids2 corresponding to the second reference initialization voltage Vr2. Here, the first reference initialization voltage Vr1 and the second reference initialization voltage Vr2 may be preset values.

The first reference initialization voltage Vr1 and the second reference initialization voltage Vr2 may be supplied to one pixel PX at different timings, and the first reference sensing current Ids1 and the second reference sensing current Ids2 may be extracted from a corresponding pixel PX according to each reference initialization voltage. For example, the first reference initialization voltage Vr1 may be supplied to a first pixel to extract the first reference sensing current Ids1, and the second reference initialization voltage Vr2 may be supplied to the first pixel to extract the second reference sensing current Ids2. That is, according to an embodiment, two reference sensing currents can be extracted for one pixel PX. In an embodiment, since the compensation image data may be generated using two reference sensing currents, the sensing time can be shortened.

Accordingly, in the display device according to the embodiment, the sensing unit 500 may supply the first reference initialization voltage Vr1 and the second reference initialization voltage Vr2 to the pixels PX, respectively, so that the first reference sensing current value corresponding to the first reference initialization voltage Vr1 and the second reference sensing current value corresponding to the second reference initialization voltage Vr2 may be obtained from each of the pixels PX.

The compensator 700 may generate the compensation image data CDATA according to the sensing pixel current value by using the artificial neural network model learned to output the reference image data corresponding to the first reference sensing current value and the second reference sensing current value. That is, the compensator 700 according to the embodiment may include the artificial neural network model.

Referring to FIGS. 7 and 8, the artificial neural network model may include an input layer IL, hidden layers HL1 and HL2, and an output layer OL to which artificial neurons AN are combined. That is, each of the input layer IL, the hidden layers HL1 and HL2, and the output layer OL may include a plurality of artificial neurons AN.

The artificial neural network model may have the ability to solve problems by changing the strength of synapse coupling through learning of the artificial neurons AN that form a network through synaptic coupling. The artificial neural network model can be called a deep neural network (DNN), and learning using the deep neural network can be called deep learning. For example, the artificial neural network model may be learned by perceptron. Here, the algorithm of the artificial neural network model may be applied to various algorithms, such as a radial basis function network, a kohonen self-organizing network, a recurrent neural network, and the like.

The artificial neurons AN of the input layer IL may output a signal corresponding to an input value. Signals of the input layer IL may have weight values reflected by the artificial neurons AN of the hidden layers HL1 and HL2. The artificial neurons AN of the output layer OL may output a value corresponding to the input value.

In an embodiment, the first reference sensing current value Ir1 and the second reference sensing current value Ir2 for each pixel PX may be input to the input layer IL. Accordingly, the artificial neural network model may perform deep learning through the artificial neurons AN so that reference image data RDATA corresponding to the reference sensing current values Ir1 and Ir2 of each pixel PX is output.

For example, FIG. 7 shows an algorithm in which the first reference sensing current value Ir1 and the second reference sensing current value Ir2 are input to the input layer IL, and the reference image data RDATA corresponding to the first reference sensing current value Ir1 and the second reference sensing current value Ir2 are output through deep learning.

In an embodiment, in order to form the artificial neural network model in which the reference image data RDATA corresponding to the reference sensing current value is output, for all pixels PX, two reference sensing current values Ir1 and Ir2 for each pixel PX may be input to the input layer IL, and the reference image data RDATA corresponding to the reference sensing current values Ir1 and Ir2 may be output through the output layer OL. The artificial neural network model may output the reference image data RDATA corresponding to the reference sensing current value hundreds to thousands of times to form a compensation image data output model corresponding to an optimal sensing current value.

Also, in an embodiment, the input layer IL may receive a sensing pixel current value Isds.

When the sensing pixel current value Isds of a predetermined pixel PX is input to the input layer IL, the compensator 700 according to an embodiment may output the compensation image data CDATA corresponding to the sensing pixel current value Isds by using the learned artificial neural network model. For example, in FIG. 8, the sensing pixel current value Isds for a specific pixel (for example, a sensing pixel) is input to the input layer IL, and the compensation image data CDATA is output through the artificial neural network model.

The compensation image data CDATA for the sensing pixel may be supplied to the pixel unit 100 through the data driver 400 (refer to FIG. 1) as a value for improving deviation in characteristics of driving transistors of the pixel unit 100.

According to the embodiment, since the compensation image data reflecting the characteristics of the driving transistor may be generated using the learned artificial neural network model, the display device having improved luminance deviation and afterimage can be implemented.

Hereinafter, an effect of the display device according to an embodiment will be described with reference to FIGS. 9 and 10.

FIG. 9 is an image illustrating an effect of improving a display unit according to compensation of image data in a display device according to a comparative example and the display device according to an embodiment. FIG. 10 is a table illustrating the effect of improving the display unit according to compensation of image data in the display device according to the comparative example and the display device according to an embodiment.

Referring to FIG. 9, since the display device according to the embodiment generates the compensation image data through the artificial neural network model, the display device having improved luminance deviation and afterimage and excellent display quality can be provided. Images shown in FIG. 9 may be one region of the pixel unit 100 described with reference to FIG. 1.

For example, in 16 grayscales and 64 grayscales, luminance deviation σ in the display unit according to the embodiment may be smaller than that in the display unit according to the comparative example. Specifically, the luminance deviation σ in the display unit according to the embodiment may be 0.1 nit or 0.3 nit, and the luminance deviation σ in the display unit according to the comparative example may be 1.0 nit or 2.0 nit. The luminance deviation σ in the display unit according to the comparative example without compensation is 1.6 nit and 4.2 nit, which may be significantly greater than the luminance deviation σ in the display device according to the embodiment.

Referring to FIG. 10, since the display device according to the embodiment generates the compensation image data through the artificial neural network model, the display device having improved luminance deviation and afterimage and excellent display quality can be provided.

For example, in 16 grayscales and 64 grayscales, the sensing current Ids in the driving transistor in the display device according to the embodiment may be less than that in the display device according to the comparative example. Specifically, the sensing current Ids in the display device according to the embodiment may be 0.1 nA or 0.3 nA, and the sensing current Ids in the display device according to the comparative example may be 1.0 nA or 2.0 nA. In addition, the sensing current Ids in the display device according to the comparative example without compensation may be 1.6 nA or 4.2 nA. That is, since the display device according to the embodiment performs compensation reflecting the characteristics of the driving transistor using the learned artificial neural network model, reductions in the amount of change in voltage in the sensing line and the amount of change in mobility in the driving transistor can be confirmed through reduction of the sensing current in the driving transistor.

In addition, in 16 grayscales and 64 grayscales, the luminance deviation σ in the display device according to the embodiment may be smaller than that in the display device according to the comparative example. Specifically, the luminance deviation σ in the display unit according to the embodiment may be 0.3 nit or 0.9 nit, and the luminance deviation σ in the display unit according to the comparative example may be 0.1 nit or 1.4 nit. The luminance deviation σ in the display unit according to the comparative example without compensation is nit and 2.6 nit, which may be significantly greater than the luminance deviation σ in the display device according to the embodiment.

Accordingly, since the display device according to the embodiment generates the compensation image data signal reflecting the characteristics of the driving transistor using the learned artificial neural network model, the display device having improved luminance deviation can be implemented.

Hereinafter, a compensation method of a display device according to an embodiment will be described with reference to FIG. 11.

Figure 11:
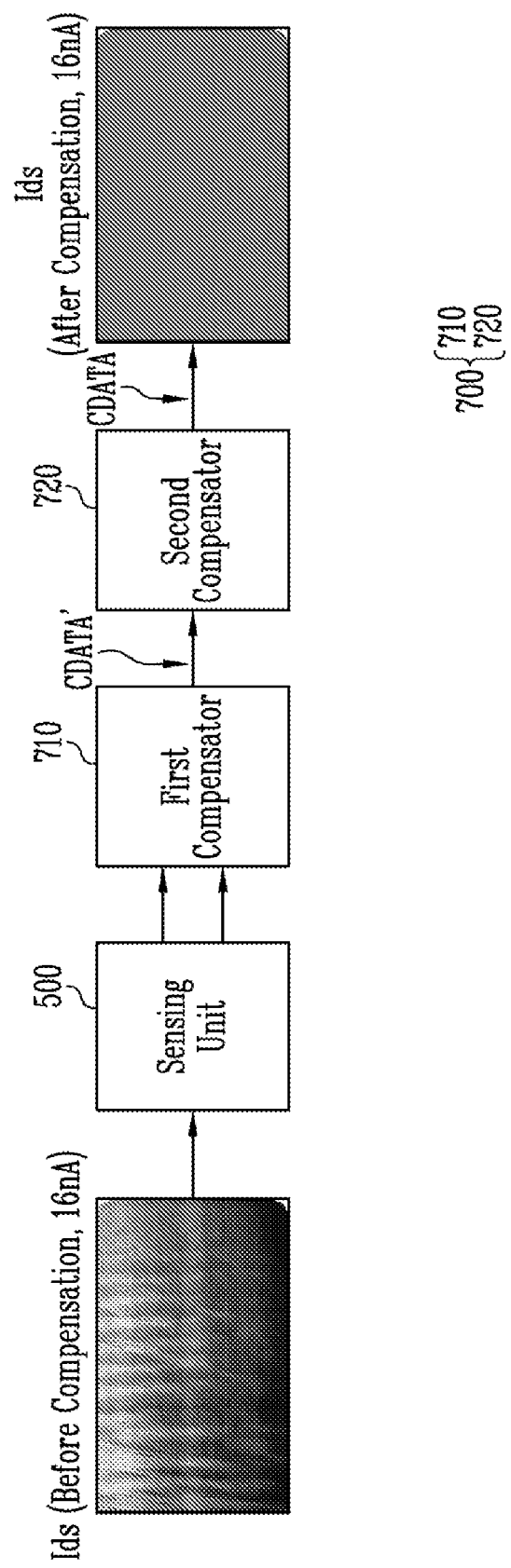
FIG. 11 is a block diagram for explaining a compensation method of a display device according to an embodiment.

FIG. 11 is a block diagram for explaining a compensation method of a display device according to an embodiment.

Referring to FIG. 11, the compensator 700 of the display device according to an embodiment may include a first compensator 710 and a second compensator 720. Since the sensing unit 500 and the compensator 700 of FIG. 11 may be the same as the sensing unit and the compensator described with reference to FIGS. 1 and 5, duplicate descriptions thereof will be omitted.

The first compensator 710 may first compensate the reference sensing current value obtained through the sensing unit 500 by reflecting the threshold voltage and/or electron mobility of the driving transistor. Here, the reference sensing current value may be provided from the memory 600 (refer to FIG. 1) or may be provided directly from the sensing unit 500.

The first compensator 710 may generate first compensation image data CDATA' for each pixel PX by reflecting the first reference sensing current value and the second reference sensing current value for each pixel PX. Here, the process of generating the first compensation image data CDATA' may correspond to a data pre-processing process for generating the compensation image data CDATA.

The second compensation unit 720 may receive the first compensation image data CDATA' provided from the first compensator 710 and perform deep learning to generate the compensation image data CDATA using the artificial neural network model.

According to the embodiment, since the compensation image data can be generated through two compensation processes, the process using the artificial neural network model can be simplified and accuracy can be improved.

In addition, since the display device according to the embodiment generates the compensation image data reflecting the characteristics of the driving transistor using the learned artificial neural network model, the display device having improved luminance deviation and afterimage can be implemented.

Hereinafter, a driving method of a display device according to an embodiment will be described with reference to FIG. 12.

Figure 12:
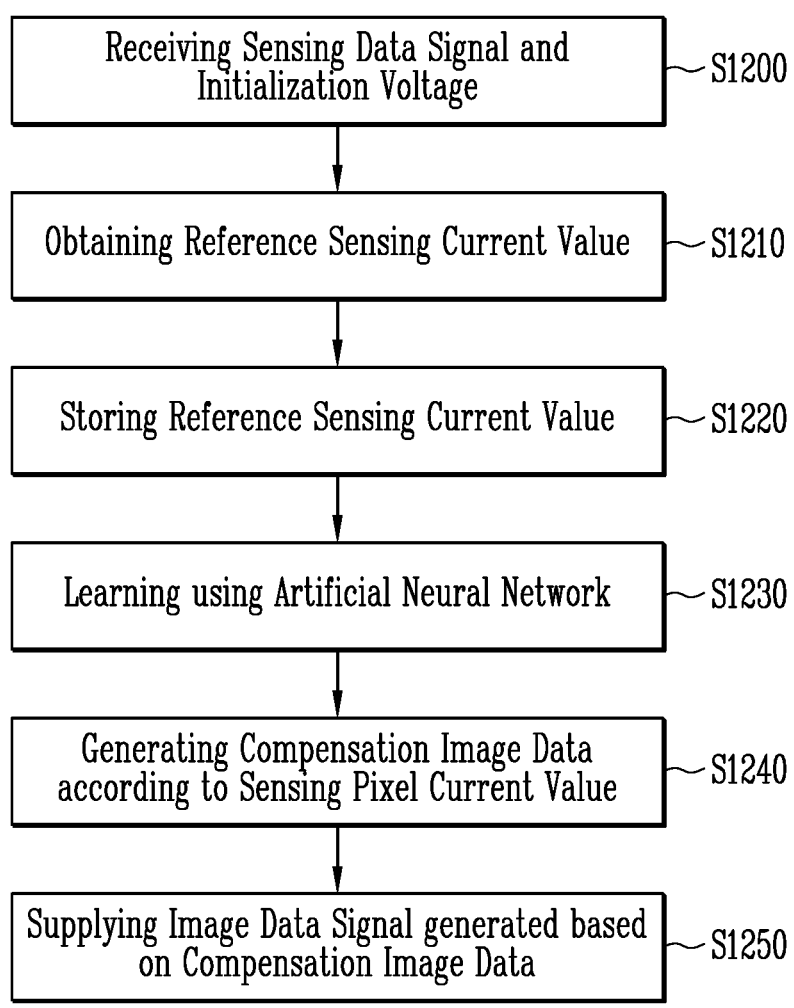
FIG. 12 is a flowchart for explaining a driving method of a display device according to an embodiment.

FIG. 12 is a flowchart for explaining a driving method of a display device according to an embodiment.

Referring to FIG. 12, a driving method of a display device according to an embodiment may include: supplying a sensing data signal to a data line and an initialization voltage to a sensing line during a sensing period (S1200); obtaining a reference sensing current value from at least one of pixels through the sensing line (S1210); storing the reference sensing current value (S1220); deep learning using an artificial neural network model to output compensation image data corresponding to at least one reference sensing current value among a sensing current value (S1230); generating the compensation image data according to a sensing pixel current value of a sensing pixel (S1240); and supplying an image data signal generated based on the compensation image data (S1250).

Since the steps described with reference to FIG. 12 have been described in detail in the components of the display device described with reference to FIGS. 1 to 9, detailed descriptions thereof will be omitted.

According to the inventive concepts, since the compensation image data reflecting the characteristics of the driving transistor may be generated using the learned artificial neural network model, the display device having improved luminance deviation and afterimage can be implemented.

In addition, according to the inventive concepts, since the compensation image data may be generated using two reference sensing current values, the sensing time can be shortened.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising: pixels connected to a data line and a sensing line; a data driver configured to supply one of an image data signal and a sensing data signal to the data line; a sensing unit configured to supply an initialization voltage to at least one of the pixels through the sensing line and obtaining a sensing current value from at least one of the pixels through the sensing line; and a compensator configured to generate compensation image data according to a sensing pixel current value among the sensing current value using an artificial neural network model learned to output reference image data corresponding to at least one reference sensing current value among the sensing current value, wherein: the sensing unit supplies a preset reference initialization voltage among the initialization voltage to the pixels, and obtains the at least one reference sensing current value; the at least one reference sensing current value includes a first reference sensing current value and a second reference sensing current value; the sensing unit supplies a preset first reference initialization voltage and a preset second reference initialization voltage among the initialization voltage to the pixels, and obtains the first reference sensing current value corresponding to the preset first reference initialization voltage and the second reference sensing current value corresponding to the preset second reference initialization voltage from each of the pixels; the artificial neural network model includes an input layer, a hidden layer, and an output layer to which artificial neurons are combined; the input layer receives the first reference sensing current value and the second reference sensing current value for each pixel among the pixels; and the output layer outputs the reference image data corresponding to the first reference sensing current value and the second reference sensing current value.

2. The display device of claim 1, wherein the artificial neural network model performs deep learning through the artificial neurons so that the reference image data corresponding to the first reference sensing current value and the second reference sensing current value are output from each of the pixels.

3. The display device of claim 1, wherein:
the pixels are connected to a scan line and a control line; and
each of the pixels includes:
  a light emitting element;
  a first transistor including a gate electrode connected to a first node, a first electrode connected to a first driving voltage through a first power source line, and a second electrode connected to a first electrode of the light emitting element;
  a second transistor including a gate electrode connected to the scan line, a first electrode connected to the data line, and a second electrode connected to the first node;
  a third transistor including a gate electrode connected to the control line, a first electrode connected to the sensing line, and a second electrode connected to the second electrode of the first transistor; and
  a storage capacitor connected between the first node and the second electrode of the first transistor.

4. A display device comprising: pixels connected to a data line and a sensing line; a data driver configured to supply one of an image data signal and a sensing data signal to the data line; a sensing unit configured to supply an initialization voltage to at least one of the pixels through the sensing line and obtaining a sensing current value from at least one of the pixels through the sensing line; and a compensator configured to generate compensation image data according to a sensing pixel current value among the sensing current value using an artificial neural network model learned to output reference image data corresponding to at least one reference sensing current value among the sensing current value, wherein: the sensing unit supplies a preset reference initialization voltage among the initialization voltage to the pixels, and obtains the at least one reference sensing current value; the at least one reference sensing current value includes a first reference sensing current value and a second reference sensing current value; the sensing unit supplies a preset first reference initialization voltage and a preset second reference initialization voltage among the initialization voltage to the pixels, and obtains the first reference sensing current value corresponding to the preset first reference initialization voltage and the second reference sensing current value corresponding to the preset second reference initialization voltage from each of the pixels; the artificial neural network model includes an input layer, a hidden layer, and an output layer to which artificial neurons are combined; the input layer receives the sensing pixel current value; and the compensator generates the compensation image data corresponding to the sensing pixel current value by using a learned artificial neural network model.

5. The display device of claim 4, wherein the compensator provides the compensation image data to the data driver, and the data driver supplies the image data signal to the pixels based on the compensation image data.

6. A driving method of a display device including pixels connected to a scan line, a control line, a data line, and a sensing line, the display device being driven to include a display period for displaying an image and a sensing period for sensing characteristics of a driving transistor included in each of the pixels, comprising: supplying a sensing data signal to the data line and an initialization voltage to the sensing line during the sensing period, wherein, in supplying the initialization voltage, preset first and second reference initialization voltages among the initialization voltage are supplied to the pixels; obtaining a sensing current value from at least one of the pixels through the sensing line, wherein, in the obtaining the sensing current value, first and second reference sensing current values respectively corresponding to the preset first and second reference initialization voltages are obtained; storing the first reference sensing current value and the second reference sensing current value; performing deep learning using an artificial neural network model so that a reference image data corresponding to the first reference sensing current value and the second reference sensing current value is output from each of the pixels; and generating compensation image data according to a sensing pixel current value among the sensing current value using the artificial neural network model learned to output the reference image data.

7. The driving method of claim 6, wherein:
the artificial neural network model includes an input layer, a hidden layer, and an output layer to which artificial neurons are combined;
the input layer receives the sensing current value; and
the output layer outputs the compensation image data.

8. The driving method of claim 7, wherein:
the input layer receives the first reference sensing current value and the second reference sensing current value for each pixel among the pixels; and
the output layer outputs the reference image data corresponding to the first reference sensing current value and the second reference sensing current value.

9. The driving method of claim 7, wherein the input layer receives the sensing pixel current value and generates the compensation image data corresponding to the sensing pixel current value using a learned artificial neural network model.

10. The driving method of claim 6, further comprising supplying an image data signal generated based on the compensation image data to the pixels through the data line.

* * * * *